United States Patent
Shin

(10) Patent No.: US 7,344,476 B2
(45) Date of Patent: Mar. 18, 2008

(54) SYSTEM FOR STARTING AUTOMATIC CAR IN SAFETY AND A METHOD THEREOF

(76) Inventor: Hyun-Oh Shin, D-101 Kumgok-Villa, 158-7 Kumgok-Dong, Namyangju-Si, Kyungki-Do 472-804 (KR)

( * ) Notice: Subject to any disclaimer, the term of this patent is extended or adjusted under 35 U.S.C. 154(b) by 186 days.

(21) Appl. No.: 10/564,879

(22) PCT Filed: Jul. 30, 2003

(86) PCT No.: PCT/KR03/01520

§ 371 (c)(1),
(2), (4) Date: Jan. 17, 2006

(87) PCT Pub. No.: WO2005/009778

PCT Pub. Date: Feb. 3, 2005

(65) Prior Publication Data

US 2006/0247092 A1 Nov. 2, 2006

(30) Foreign Application Priority Data

Jul. 25, 2003 (KR) .................. 10-2003-0051568

(51) Int. Cl.
*B60W 10/04* (2006.01)
*B60W 10/10* (2006.01)
*B60W 10/18* (2006.01)
*B60W 10/06* (2006.01)

(52) U.S. Cl. ...................... 477/111; 477/203

(58) Field of Classification Search .............. 477/111, 477/99, 218, 203, 204, 210, 211

See application file for complete search history.

(56) References Cited

U.S. PATENT DOCUMENTS

| 3,268,026 | A | * | 8/1966 | MacDuff et al. | 180/172 |
| 5,166,881 | A | * | 11/1992 | Akasu | 701/96 |
| 6,324,459 | B1 | | 11/2001 | Jung | |
| 6,332,524 | B1 | | 12/2001 | Shin | |
| 6,621,175 | B1 | * | 9/2003 | Kuroda et al. | 290/40 D |
| 6,752,112 | B1 | * | 6/2004 | Ohata et al. | 123/179.4 |

FOREIGN PATENT DOCUMENTS

| JP | 01-109127 | 4/1989 |
| JP | 01-195137 | 8/1989 |
| KR | 1999-68802 | 9/1999 |

OTHER PUBLICATIONS

Babel Fish translation of KR1999-68802.*

* cited by examiner

*Primary Examiner*—Tisha Lewis
(74) *Attorney, Agent, or Firm*—IPLA P.A.; James E. Bame

(57) ABSTRACT

A system for staring an automatic car in safety and a method thereof, comprises: an engine speed detecting unit; a foot brake input detecting unit; a gear position detecting unit detecting whether a gear shift lever is in the neutral (N) position; a vehicle speed sensing unit parallel with the foot brake input detecting unit; a control unit making the engine not started when the foot brake is not operative and the gear shift velvet is not in the neutral position; a starting device starting the engine under the control of the control unit; and vacuum apparatus under the control of the control unit for sucking air in a Hydro-vac and turning the Hydro-vac into a vacuum state.

9 Claims, 6 Drawing Sheets

SYSTEM FOR STARTING AUTOMATIC CAR IN SAFETY AND A METHOD THEREOF

TECHNICAL FIELD

The present invention relates to a system for starting an automobile which automates the operation of a transmission (hereinafter, an automatic car) in safety and a method thereof, and more particularly, to a system for starting an automatic car in safety and a method thereof, which do not serve as a post measure but prevent an accident in advance by being converted into such a structure that no sudden start accident can occur.

BACKGROUND ART

In recent years, the sudden start accident of automatic cars has been frequently occurred to thus cause heavy casualties. But, the reason why a sudden start occurs has not been clearly examined so far.

Most of the sudden start accident (hereinafter, a sudden start) occurs not during driving but at the instant the engine is started. As a complementary measure for this, various sudden start accident preventing devices are being developed, but all of them are configured to rapidly break a sudden start after the sudden start is occurred.

In addition, the foot brake of a car that is generally used at the present is designed from a viewpoint that the foot brake is basically needed only when braking the car in a state the car is moving by an engine, and it is needless at the state of the engine stopped. Thus, the foot brake is made to operate by a pressure of a Hydro-vac™ that operates after a predetermined time after the engine is started. Actually, for the operation of a hydraulic foot brake, a brake oil, which has a pressure amplified by a part called a Hydro-vac when a foot brake pedal is depressed, is delivered to a cylinder of a foot brake device equipped at each of wheels, and a braking operation is carried out by a friction pad that is to be coupled to the cylinder. The amplifying operation of the Hydro-vac enables the Hydro-vac to be operative by sucking air in the Hydro-vac and maintaining the Hydro-vac in a vacuum state when exhaust, suction and stroke processes are proceeded as the engine is started. By this, it takes a predetermined time after the starting of the engine until the Hydro-vac becomes completely vacuum state.

Therefore, even if a driver steps on the foot brake right after the occurrence of a sudden start accident, the foot brake is operated after the above-mentioned predetermined time. The car abruptly accelerated during that time is moved as much as a predetermined distance at an accelerated speed, and if there is an obstacle or person in the vicinity until the foot brake is operative, this causes a damage or casualties.

Additionally, the conventionally suggested apparatus for preventing a sudden start accident is also problematic in that it is unable to perform a rapid braking after the occurrence of the abrupt acceleration, there is a room for the occurrence of an accident.

Further, in the conventional car operating system, the moment the engine is started, the engine speed (RPM) is rapidly increased irregardless of whether an accelerator is depressed or not, then lowered to a predetermined level, and thereafter the engine speed is adjusted according to the degree of the depression of the accelerator. Hence, since a gear shift lever is shiftable at any time, in a case that the driver is busy, a sudden start can be done by abruptly shifting the gear shift lever to D or R range while starting the car in a parking (P) or neutral (N) position. Moreover, in view of the gear shift range of P-R-N-D-1-2 (parking-reverse-neutral-drive-first speed-second speed), in case of starting an automatic car, the automatic car is firstly shifted from the packing (P) position to the reverse (R) position and then shifted to the neutral (N) position. By this, there is a possibility that a sudden start accident may occur due to defects of the car or unskilled manipulation of the driver or the like.

DISCLOSURE OF INVENTION

The present invention has been developed for the purpose of solving the foregoing problems and thus it is an object of the present invention to provide a system for starting an automatic car in safety and a method thereof, which do not serve as a post measure on the occurrence of a sudden start accident but prevent the occurrence of a sudden start in advance.

To achieve the above object, there is provided a method of starting an automatic car in safety according to the present invention, which prevents a sudden start by starting the engine when a gear shift lever is in the neutral position and a foot brake is precisely operated in the step of starting the engine and locking the gear shift lever so that the gear shift lever is not shifted in the neutral position until the engine speed is lowered to less than a reference value after starting the engine.

Additionally, a system for starting an automatic car in safety using the above method comprises: an engine speed detecting unit detecting the current speed of an engine; a foot brake input detecting unit detecting whether a foot brake is operative; a gear position detecting unit detecting whether a gear shift lever is in the neutral (N) position; a vehicle speed sensing unit being operated parallel with the foot brake input detecting unit and sensing the speed of a vehicle; a control unit making the engine not started when the foot brake is not operative and the gear shift lever is not in the neutral position in the step of starting the engine and making the gear shift lever not shifted in the neutral position until the engine speed is lowered to less than a reference value after the engine is started as the above condition is satisfied; a gear shift lever locking device fixing the gear shift lever so that the gear shift lever is not shifted and then releasing the neutral and locking position of the gear shift lever under the control of the control unit; a starting device starting the engine under the control of the control unit; and a vacuum apparatus being connected to an air suction pipe in a Hydro-vac via a check valve and being operated upon supplying of the power of a battery when an ACC switch is turned on.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Hereinafter, a system for starting an automatic car in safety and a method thereof according to a preferred embodiment of the present invention will now be described in detail with reference to the accompanying drawings.

Figure 1:
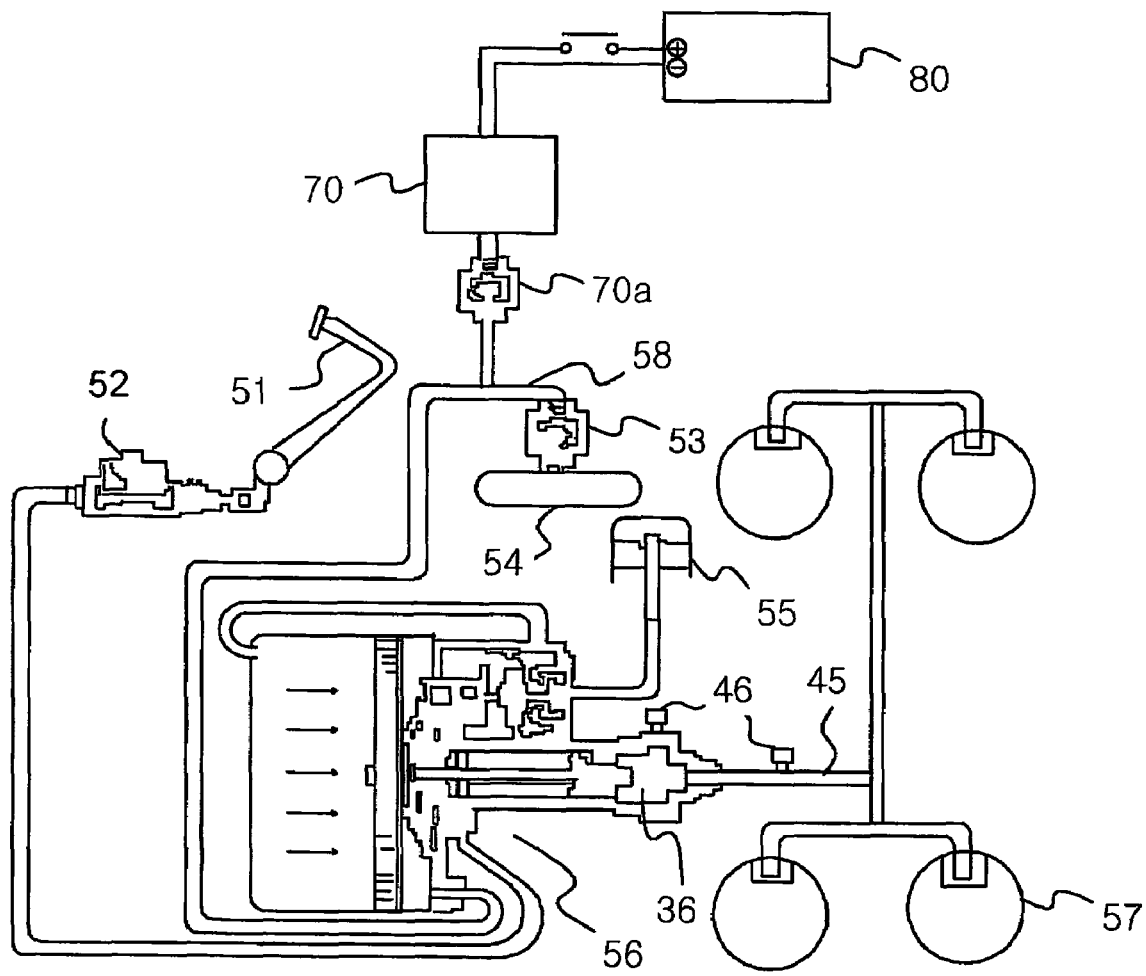
FIG. 1 is a reference view for explaining a schematic construction of a system for starting an automatic car according to an embodiment of the present invention.

FIG. 1 is a reference view for explaining a schematic construction of a system for starting an automatic car according to an embodiment of the present invention. As shown in FIG. 1, in the schematic construction of the system for starting an automatic car according to the embodiment of the present invention, a vacuum apparatus 70 is connected to an air suction pipe 58 of a Hydro-vac 56 via a check valve 70a preventing the backflow of air to the Hydro-vac 56, the driving power source of the vacuum apparatus 70 is connected to a battery 80 via a contact point of an ACC switch of a key switch, and an oil pressure sensor 46 is installed on a hydraulic cylinder 36 of the Hydro-vac 56 or on an oil pipe 45.

Additionally, there is provided a brake pedal 51 for operating a foot brake, a foot brake operating power transmission device 52 which is one of parts of the Hydro-vac, a check valve 53 for preventing the backflow of air entering into an engine, a suction apparatus 54 maintaining a vacuum state like a conventional car, a brake oil reserve tank 55 supplementing oil so that a car does not run short of oil as a brake pad is abraded, wheels 57 of the car and the like.

Figure 2:
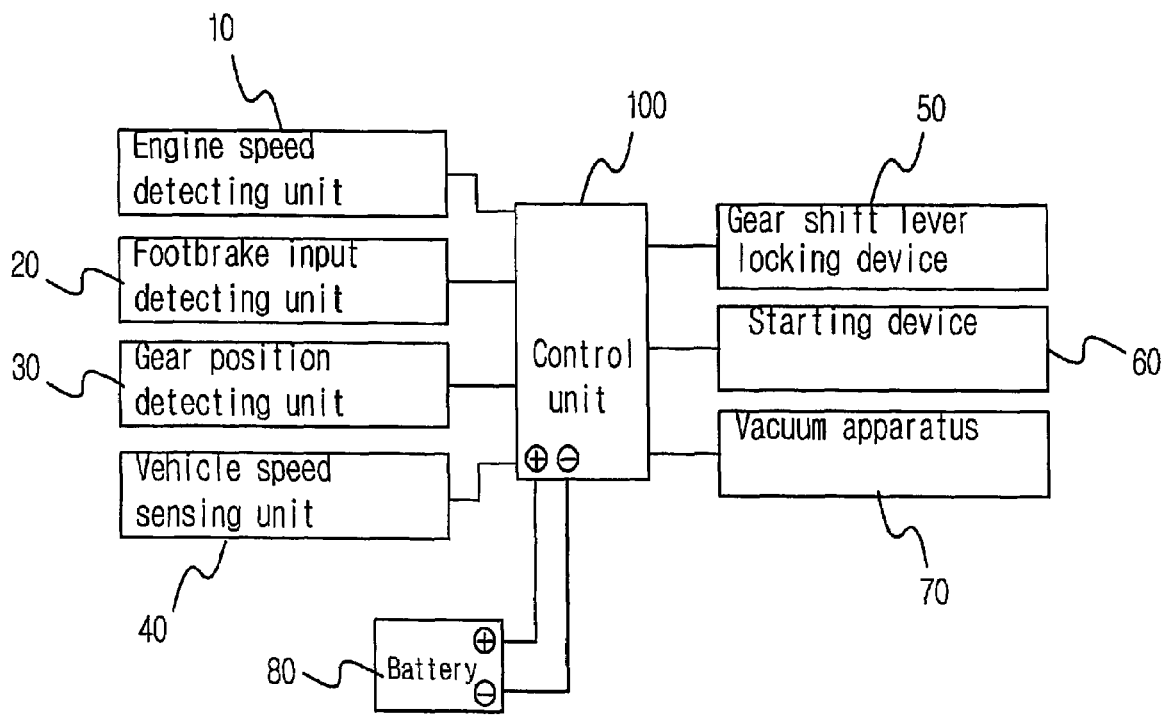
FIG. 2 is a block diagram of the system for starting an automatic car in safety according to the present invention.

FIG. 2 is a block diagram of the system for starting an automatic car in safety according to the preferred embodiment of the present invention. As shown in FIG. 2, the system for starting an automatic car in safety includes: an engine speed detecting unit 10 detecting the current speed of an engine; a foot brake input detecting unit 20 detecting whether a foot brake is operative; a gear position detecting unit 30 detecting whether a gear shift lever is in the neutral (N) position; a vehicle speed sensing unit 40 being operated parallel with the foot brake input detecting unit 20 and sensing the speed of a vehicle; a control unit 100 making the engine not started when the foot brake is not operative and the gear shift lever is not in the neutral position in the step of starting the engine, locking the gear shift lever not shifted in the neutral position until the engine speed is lowered to less than a reference value after the engine is started as the above condition is satisfied, and controlling a vacuum apparatus 70 to be turned off when the engine rotates; a gear shift lever locking device 50 fixing the gear shift lever to the neutral position if the engine speed is more than a reference value upon starting under the control of the control unit; a starting device 60 starting the engine under the control of the control unit 100; and a vacuum apparatus 70 sucking air in a Hydro-vac by being driven by an operating power supplied from a battery under the control of the control unit when the key switch is in an ACC state.

The engine speed detecting unit 10 is a sensor detecting an engine speed (RPM), and the foot brake input detecting unit 20 is a pressure sensor 46 detecting whether the foot brake is operative or not which is disposed on the oil pipe 45 connected to a wheel cylinder 44 disposed in each of wheels and detects the pressure of brake oil. That is, since the pressure of brake oil is high in a braked state and the pressure of oil is low in a non-braked state, it is possible to detect an operation state of the foot brake by the pressure sensor 46. Moreover, upon depressing on a conventional foot brake pedal, the braking clearance of the foot brake is occurred according to a car type and an abrasion state. By the foot brake input detecting unit 20 as described above, it is possible to precisely detect whether the car is braked or not by checking the pressure of the foot brake, even if each car is different in braking clearance.

The gear position detecting unit 30 detects that the present position of the gear shift lever, and can be implemented by installing a position detecting sensor at each range. Although a position detecting sensor detecting only the neutral position is exemplified in the embodiment of this invention, it may be installed at other ranges as necessary.

Unexplained reference numeral 80 is a battery equipped inside the car and supplies power to the above-described control unit.

The vacuum apparatus 70 is driven by an operating power supplied from the battery under the control of the control unit 100 when the key switch is in the ACC state, thereby sucking air in the Hydro-vac 56.

The Hydro-vac 56 connects the vacuum apparatus 70 to the air suction pipe 58 via the check valve 70a for preventing the backflow of air to the Hydro-vac 56, and the driving power source of the vacuum apparatus 70 is connected to the battery 80 via a contact point of the ACC switch of the key switch.

In the above description, the starting device 60 refers to a starting motor.

Figure 3:
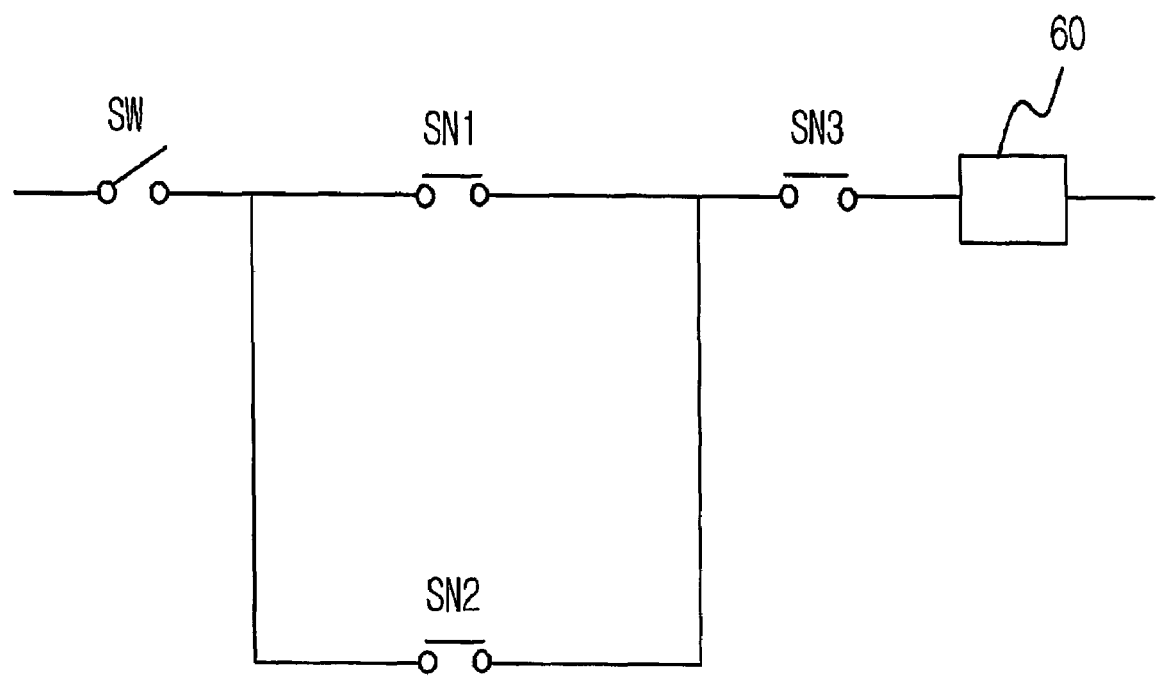
FIG. 3 is a layout of sensors in the system for starting an automatic car in safety according to the embodiment of the present invention.

FIG. 3 is a layout of sensors in the system for starting an automatic car in safety according to the preferred embodiment of the present invention. As shown therein, the sensors in the system for starting an automatic car in safety includes a vehicle speed sensor SN1, a foot brake sensor SN2 and a gear position sensor SN3. The sensors are arranged in connection with a key switch SW, a gear shift lever locking device 50 and a starting device 60. The vehicle speed sensor SN1 and the foot brake sensor SN2 are connected in parallel.

Thus, as described above, it is made possible that the foot brake input detecting unit 20 and the vehicle speed sensing unit 40 are operated in parallel, the foot brake input detecting unit 20 including the foot brake sensor SN2 and the vehicle speed sensing unit 40 provided with the vehicle speed sensor SN1 for sensing the speed of a vehicle.

Hence, according to the present invention, when a restart is tried because the engine is stopped in a high-speed driving, the engine can be started only by placing the gear shift lever on the neutral (N) position with a foot brake operation being omitted. That is, though the power of the engine is not transmitted to the wheel via an automatic transmission and a drive axle, the driving car continues to travel by an accelerated speed to thus detect a driving speed by the vehicle speed sensor SN1 and uses it in parallel with a foot brake signal. In other words, when the car is stopped, a circuit is mainly operated by a foot brake operation signal, and when the car is moving, the circuit is mainly operated by a signal from the vehicle speed sensor SN1 based on the opening angle of a throttle valve based on the opening angle of a throttle valve.

Additionally, the problem that, when the gear shift lever is changed from the drive (D) position to the neutral (N) position from carelessness during driving, the foot brake has to be turned on and the engine speed has to be normal in order to shift the gear shift lever, is solved by connecting the vehicle speed sensor SN1 and the foot brake sensor SN2 in parallel and using them in parallel, as described above.

Figure 4:
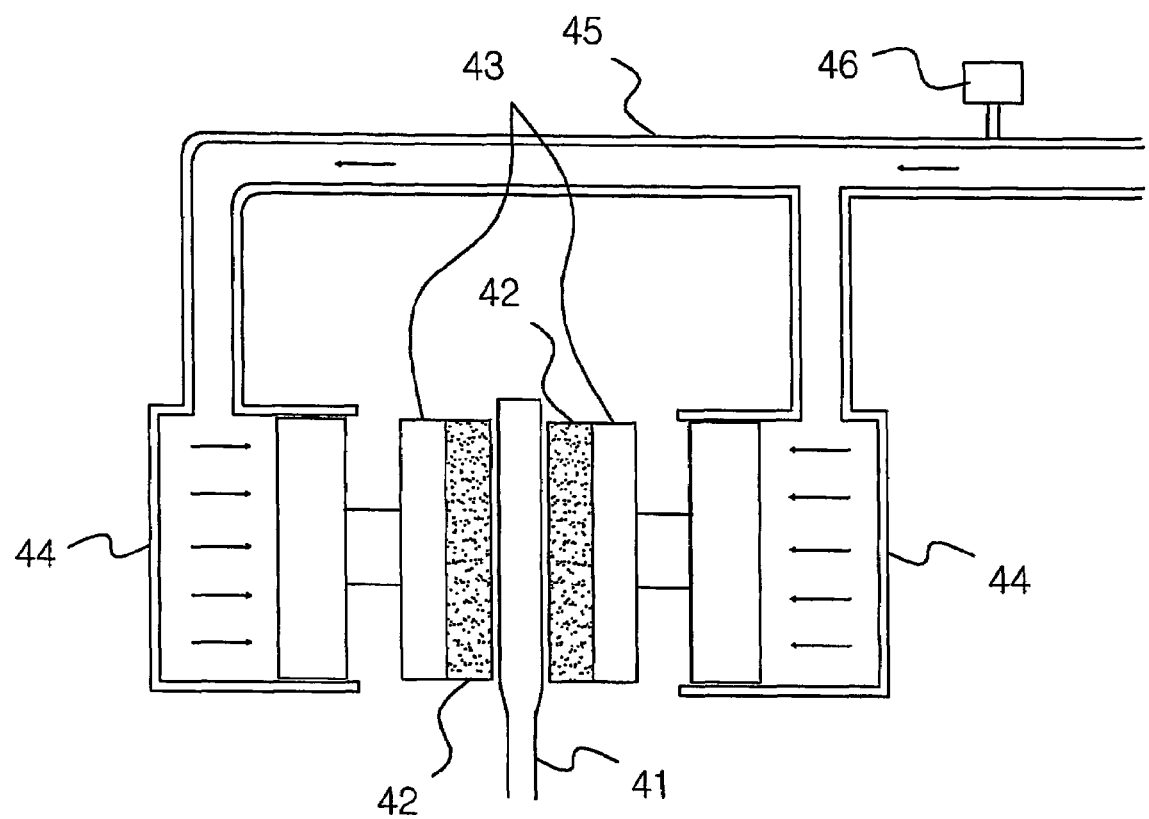
FIG. 4 is a reference view for explaining a foot brake input detection in the system for starting an automatic car in safety according to the embodiment of the present invention.

FIG. 4 is a reference view for explaining a foot brake input detection in the system for starting an automatic car in safety according to the preferred embodiment of the present invention. As shown in FIG. 4, for the foot brake input detection, the oil pressure sensor 46 is disposed on the oil pipe 45 supplying oil to the cylinder 44 braking the car by pushing a braking pad 42 from both sides of a disk 41 rotating along with wheels and making it contacted to the disk 41. When the pressure of brake oil detected by the oil pressure sensor 46 is higher than a predetermined value, it is determined that the foot brake is operative.

The foot brake input detecting unit 20 includes a pressure sensor which is installed on the oil pipe connecting the Hydro-vac on the center and a hydraulic cylinder for a foot brake operation installed in each of the wheels and detects the pressure of brake oil.

Figure 5:
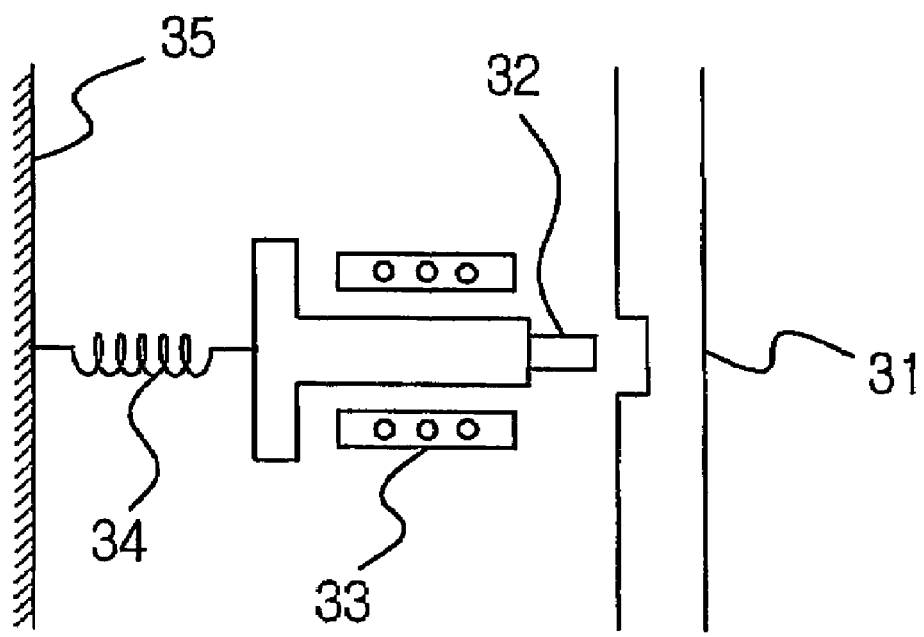
FIG. 5 is a block diagram of a gear shift lever locking device in the system for starting an automatic car in safety according to the embodiment of the present invention.

FIG. 5 is a block diagram of a gear shift lever locking device in the system for starting an automatic car in safety according to the preferred embodiment of the present invention. As shown in FIG. 5, the gear shift lever locking device 50 is constructed in such a manner that a groove is formed on a gear shift lever 31, an electronic solenoid 33 coupled with a stopper 32 is operated upon the applying of power so that the stopper can be inserted into the groove, and the opposite side of the moving axis of the electronic solenoid coupled with the stopper is fixed by a spring 34 so that the stopper cannot be inserted into the groove when power is not supplied.

In other words, in the gear shift lever locking device, the groove is hollowed out on one side face of the lower end of a gear shift lever 31 for locking the gear shift lever, the moving axis of an electronic solenoid 33 is integrally connected to one end of a stopper 32 formed to be inserted into the groove, the electronic solenoid 33 is disposed so that the stopper 32 can be inserted into the groove of the gear shift lever 31 when the gear shift lever is in the neutral (N) position, the spring 34 is connected to the other end of the moving axis having the stopper 32 of the electronic solenoid 33 being disposed, and the spring 34 is fixed to a body 35 of a transmission casing so that the stopper 32 is separated from the groove when the electronic solenoid 33 is not operative.

Therefore, the system of this invention enables a foot brake operation starting from the step of turning on the ACC switch SW1 before starting the engine, in which when a driver turns the key switch SW to turn on the ACC switch SW1, the power of the battery 80 is supplied to the vacuum apparatus 70. The vacuum apparatus 70 is connected to the air suction pipe 58 via the check valve 70a, and as described above, a battery power is supplied to the vacuum apparatus 70 when the ACC switch SW1 is turned on. Whereupon, the vacuum apparatus 70 sucks the air in the Hydro-vac 56 and makes it into a vacuum state.

Here, the Hydro-vac 56 is lowered in hydraulic pressure if air is included, thus it cannot amplify the power represented by depressing the foot brake pedal 51. In the present invention, as described above, the power of the foot brake pedal 51 can be amplified since the ACC states is turned to a vacuum state. At this time, the car can be braked in safety before starting the engine.

In the ACC state, power is applied to the vacuum apparatus 70 and simultaneously an operating power is supplied to the foot brake input detecting unit 20, the engine speed detecting unit 10 and the gear position detecting unit 30, thereby operating each of the detecting units.

In this way, each of the detecting units is operated to thus apply a sensing value to the control unit 100. Since then, the control unit 100 controls the gear shift lever locking device 50, the starting device 60 and the vacuum apparatus 70 by checking a sensing value from the detecting units. Firstly, when it is determined that the gear shift lever is in the neutral position by checking the gear position detecting unit 30 and braking is accurately done by checking the sensing value input from the foot brake input detecting unit 20, the starting device 60 is controlled to be operative. When the gear shift lever is in the neutral position, the starting device 60 is operated to start the engine and then the gear shift lever locking device 50 is operated so that the gear shifting is impossible until the engine speed is lowered to less than a reference value.

Figure 6:
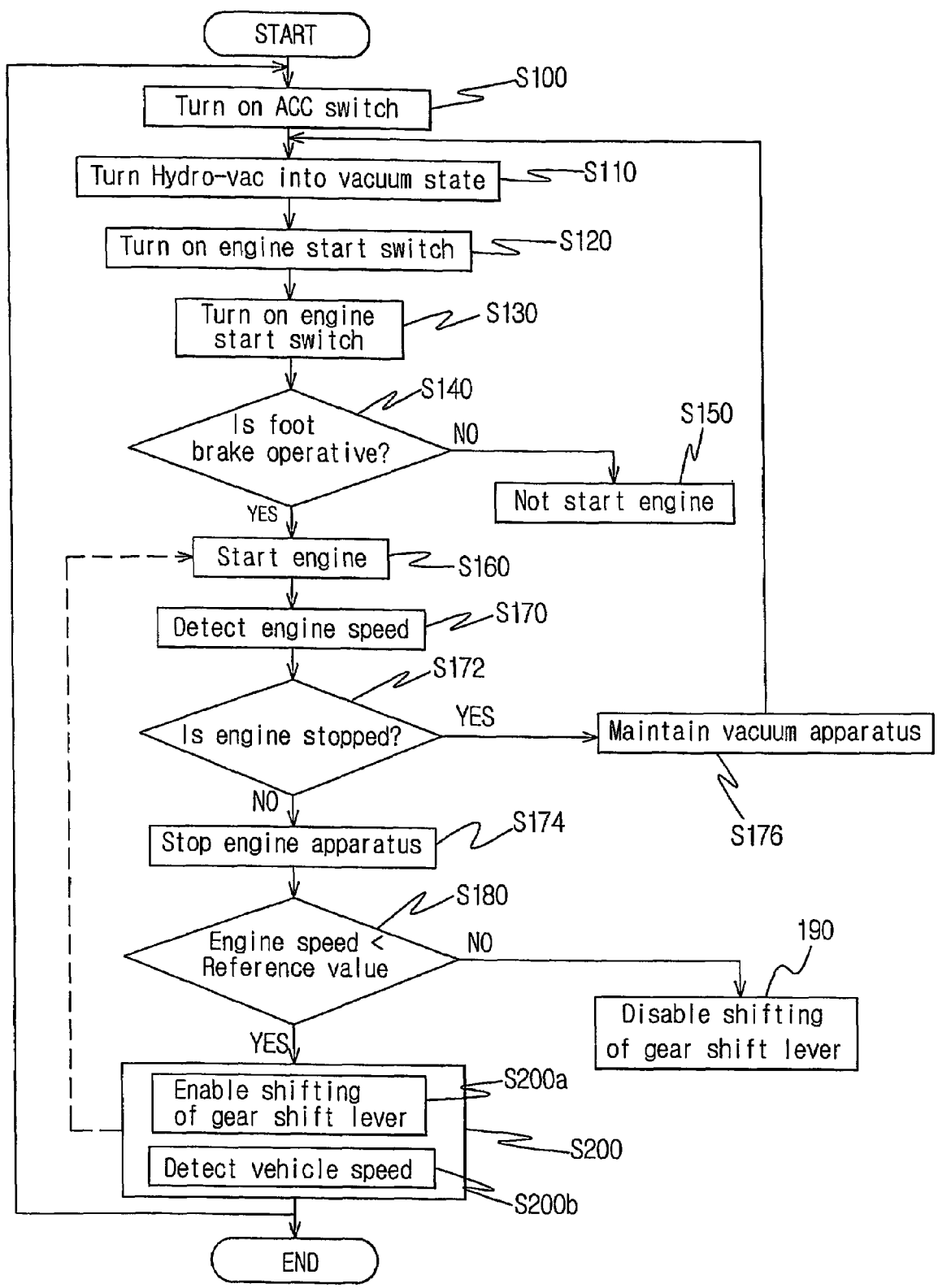
FIG. 6 is a sequential view of a method of starting an automatic car in safety according to the embodiment of the present invention.

FIG. 6 is a sequential view of a method of starting an automatic car in safety according to the embodiment of the present invention. As shown in FIG. 6, the method of starting an automatic car in safety, which uses the system for starting an automatic car in safety, comprises the steps of: turning on an ACC switch (S100); turning a Hydro-vac providing a brake oil to a foot brake into a vacuum state (S110); turning on an engine start switch (S120); detecting the positions of a gear shift lever and the foot brake (S130); as the result of the detection, determining the position of a gear shift lever and the operation state of the foot brake (S140); as the result of the detection, starting the engine if the gear is neutral and the foot brake is operative (S160), or not starting the engine if not (S150); detecting an engine speed (S170); determining whether the engine is stopped after the detection of the engine speed (S172); according to the determination for the engine stopping, stopping a vacuum apparatus 70 if the engine is not stopped (S174), or returning to the step of turning the Hydro-vac into a vacuum state by maintaining the vacuum apparatus if not (S176); determining whether the engine speed is less than a predetermined reference value (S180); as the result of the determination, disabling a gear shifting unless the engine speed is lowered to a reference value (S190), enabling a gear shifting if so (S200a), detecting a vehicle speed (S200b) and turning into a restartable state without operating the foot brake even the engine is turned on.

The above-mentioned state is called a driving state, in which a gear shift is enabled (S200a) and a vehicle speed is detected (S200b) to thereby turn into a restartable state without operating the foot brake even when the engine is turned on.

This will be explained in detail as follows.

Generally, a key switch SW of a car is composed of four stages. The condition that a car key is extracted from a key hole of a key cylinder is a locked state, the switch which is firstly turned on when the car key is inserted into the key hole of the key cylinder and then turned is an ACC switch SW1 capable of operating a primary electric apparatus such as a radio and a loom lamp, the switch to be turned on next is an ON switch SW3 in which every electric functions of the car are operable, and finally the switch to be turned on when rotated to the end is a start switch SW2. Usually, the start switch SW2 is automatically turned off when the driver leaves the car key as it is turned after the engine is started.

First of all, when the ACC switch SW1 is turned on, power is supplied to the vacuum apparatus 70 and each of the sensors, the vacuum apparatus 70 sucks the air in the Hydro-vac 56 to turn the Hydro-vac 56 into a vacuum state, and each of the sensors detects whether the foot brake is operative, an engine speed and whether the gear shift lever is in the neutral position.

Next, the driver turns on the ON switch SW3 operating various electric auxiliary devices of the car by manipulating the key switch SW, and then turns on the start switch SW2 to start the engine. And, if the engine speed becomes less than a reference value, the contact point to be turned on upon detecting a braked state by the foot brake detecting unit 20 and the contact point to be turned on by the engine speed detecting unit 10 are all turned on to thus apply power to a relay, whereby the relay is excited to turn off the contact points serially connected to the power line of the gear shift lever locking device 50.

Then, the power to the gear shift lever locking device 50 is disconnected to make the gear shift lever locking device 50 not operative. When the gear shift lever deviates from the neutral position by the driver's shifting, the contact point operating by the gear position detecting unit 30 is turned on and the operating state of the relay is maintained, thereby making the gear shift lever locking device 50 not operative.

And, an engine rotation is detected by the engine speed detecting unit 10 with the ON switch SW3 being turned on, the operating power of the vacuum apparatus 70 is disconnected to stop its operation. Since then, a vacuum state is continuously maintained by the suction device 54 like a conventional car.

Next, when the driver turns on the start switch SW2, if the foot brake is not in a braked state or the engine speed is more than a reference value, an operating power is applied to the gear shift lever locking device 50 to thus operate the gear shift lever locking device 50.

When no power is supplied to the gear shift lever locking device 50, the moving axis of the electronic solenoid 33 is moved to the left in the drawing by an elastic force of the spring 34 and the stopper separated from the groove of the gear shift lever 31. However, if the above condition is satisfied and an operating power is applied to the electronic solenoid 33, the moving axis is moved forward to insert the stopper 32 into the groove of the gear shift lever 31. As a result, the gear shift lever is locked by the stopper and thusly the gear shifting is made impossible.

When the start switch SW2 is turned on, power is supplied to the starting device 60 to start the engine as the foot brake is normally operated to be in a braked state, the gear shift lever is in the neutral position and the start switch, the contact point to be turned on when the braked state is detected from the foot brake input detecting unit 20 and the contact point to be operative when the neutral position of the gear shift lever is detected by the gear position detecting unit 30 are serially connected to the power line applied to the starting device 60.

As described above, when the engine speed is lowered to a safety state after starting the engine, that is, less than a reference value (1000 RPM), the relay is operated to release a gear locking state. By this, the driver can drive the car by shifting the gear shift lever. In a driving state, it should be noted that the relay does not operate the gear shift lever locking device 50 by the contact point of the foot brake input detecting unit 20 on which the gear shift lever is located in the other positions excepting the neutral position and keeps a turned-on state.

In addition, by connecting the vehicle speed sensor SN1 and the foot brake sensor SN2 in parallel and using them in parallel, when a restart is tried because the engine is stopped during driving, the engine is started by placing the gear shift lever in the neutral (N) position with a foot brake operation being omitted. When the gear shift lever returns to the neutral (N) position from the drive (D) position from carelessness during driving, the gear shift lever is shifted into drive (D) range.

While the invention has been described with reference to what is presently considered to be a preferred embodiment thereof, it is to be understood that the invention is not limited to the disclosed embodiment or stricture. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

INDUSTRIAL APPLICABILITY

The system for starting an automatic car in safety and a method thereof according to the present invention having the above-described construction and operation have an excellent effect of not serving as a post measure on the occurrence of a sudden start accident but preventing the occurrence of a sudden start in advance by starting the engine only when the foot brake is operative and the gear shift lever is in the neutral position.

Additionally, the system and method have another excellent effect of preventing an accident from becoming more serious since the foot brake is not operative upon the occurrence of a sudden start in the step of starting the engine by allowing the foot brake of the car to be operative not after starting the engine but in the previous step of ACC switching.

The invention claimed is:

1. A system for staffing an automatic car in safety, comprising:
    an engine speed detecting unit detecting the current speed (RPM) of an engine;
    a foot brake input detecting unit detecting whether a foot brake is operative;
    a gear position detecting unit detecting whether a gear shift lever is in the neutral (N) position;
    a vehicle speed sensing unit being operated parallel with the foot brake input detecting unit and sensing the speed of a vehicle;
    a vacuum apparatus sucking air in a Hydro-vac by being driven by an operating power supplied from a battery when a key switch is in an ACC state;
    a control unit making the engine not started when the foot brake is not operative and the gear shift lever is not in the neutral position in the step of starting the engine, locking the gear shift lever not shifted in the neutral position until the engine speed is lowered to less than a reference value after the engine is started as the above condition is satisfied, and controlling the vacuum apparatus to be turned off when the engine rotates;
    a gear shift lever locking device fixing the gear shift lever to the neutral position if the engine speed is more than a reference value upon starting under the control of the control unit; and
    a starting device starting the engine under the control of the control unit.

2. The system of claim 1, wherein the foot brake input detecting unit includes a pressure sensor which is installed on the oil pipe connecting the Hydro-vac on the center and a hydraulic cylinder for a foot brake operation installed in each of the wheels and detects the pressure of brake oil.

3. The system of claim 1, wherein the vehicle speed sensing unit has a vehicle speed sensor, the vehicle speed sensor being connected to a foot brake sensor of the foot brake input detecting unit in parallel.

4. The system of claim 1. wherein the gear shift lever locking device is constructed in such a manner that a groove is formed on the gear shift lever, an electronic solenoid coupled with a stopper is operated upon the applying of power so that the stopper can be inserted into the groove, and the opposite side of the moving axis of the electronic solenoid coupled with the stopper is fixed by a spring so that the stopper cannot be inserted into the groove when power is not applied.

5. The system of claim 1, wherein the Hydro-vac is connected to the vacuum apparatus via a check valve preventing the backflow of air to the Hydro-vac and oil pressure sensor is installed on a hydraulic cylinder of the Hydro-vac for detecting an oil pressure.

6. The system of claim 5, wherein the oil pressure sensor is installed on an oil pipe of the Hydro-vac.

7. A method of starting an automatic car in safety, which uses the system for starting an automatic car in safety comprising an engine speed detecting unit, a foot brake input detecting unit detecting whether a foot brake is operative, a gear position detecting unit, a vehicle speed sensing unit, a control unit, a gear shift lever locking device fixing the gear shift lever under the control of the control unit, a starting device starting the engine and a vacuum apparatus sucking air in a Hydro-vac by being driven by an operating power applied from a battery when the key switch is in an ACC state comprises the steps of:

turning on an ACC switch (S100);
 turning the Hydro-vac providing a brake oil to the foot brake into a vacuum state (S110);
 turning on an engine start switch (S120);
 detecting the positions of the gear shift lever and the foot brake (S130);
 as the result of the detection, determining the position of the gear shift lever and the operation state of the foot brake (S140);
 as the result of the detection, starting the engine if the gear shift lever is neutral position and the foot brake is operative (S160), or not starting the engine if not (S150);
 detecting an engine speed (S170);
 determining whether the engine speed is less than a predetermined reference value (S180); and
 as the result of the determination, disabling a gear shifting unless the engine speed is lowered to a reference value (S190), enabling the gear shifting if so (S200*a*), detecting a vehicle speed (S200*b*) and turning into a restartable state without operating the foot brake even if the engine is turned on.

8. The method of claim 7, wherein the method further comprises the steps of:

determining whether the engine is stopped after the detection of the engine speed (S172) after the step of detecting an engine speed (S170); and
 according to the determination for the engine stopping, stopping the vacuum apparatus if the engine is not stopped (S174), or returning to the step of turning the Hydro-vac into a vacuum state by maintaining the vacuum apparatus if not (S176).

9. The method of claim 7, wherein the foot brake input detecting unit includes a foot brake sensor and the vehicle speed sensing unit has a vehicle speed sensor sensing the speed of a vehicle, the vehicle speed sensor and the foot brake sensor being connected in parallel so as to be operated in parallel.

* * * * *